Patented May 3, 1932

1,856,639

UNITED STATES PATENT OFFICE

HORST-DIETRICH v. D. HORST, OF MANNHEIM, AND RUDOLF WIETZEL, OF LUDWIGS-HAFEN-ON-THE-RHINE, GERMANY, ASSIGNORS TO I. G. FARBENINDUSTRIE AKTIEN-GESELLSCHAFT, OF FRANKFORT-ON-THE-MAIN, GERMANY

PRODUCTION OF ACETALDEHYDE

No Drawing. Application filed January 17, 1930, Serial No. 421,592, and in Germany January 25, 1929.

The present invention relates to the production of acetaldehyde.

We have found that particularly good yields of acetaldehyde can be obtained by passing acetylene, or a gaseous mixture containing the same, together with steam at an elevated temperature over a catalytic substance consisting of, or containing essentially, compounds of tungsten. The temperature necessary for the reaction may be produced in any suitable manner, for example by heating from the outside the reaction chamber containing the catalyst, so that the gases are heated during their passage through the chamber, or by preheating the reaction gases or part thereof, for example the steam employed, prior to their admission into the reaction chamber. The heat produced by the reaction is very considerable and it is advisable to take care for removal of the excess heat which advantageously is employed for preheating the reaction gases.

It is generally not necessary to activate the catalytic substances, but activators may be employed if desired.

As suitable catalysts of the said kind may be mentioned, for example, the oxides of tungsten ($WO_2$, $WO_3$ and $W_2O_5$), compounds such as $H_2WO_4$ and $(NH_4)_2WO_4$ which may be readily converted into the corresponding oxides, and compounds of tungsten with elements other than those in the said compounds, for example tungsten sulphide and tungsten carbide. Complex tungstic acids, in particular silico-tungstic acid, phospho-tungstic acid and the like are particularly suitable; if desired compounds of heavy metals such as zinc oxide, cobalt sulphide, copper oxide, zinc selenide and the like may be added. Mixtures of oxides of tungsten with phosphoric acid, boric acid or other non-volatile acids are also suitable. These substances may be employed as such or on carriers, for example on pumice stone or pieces of clay. The catalytic substances as well as any carriers employed should not contain any compounds of iron since these render the catalyst less efficient, so that consequently compounds of iron are removed from a carrier employed, for example by heating the latter with hydrochloric acid. The mixing of the acetylene with the water vapor may be effected by passing the acetylene through hot or boiling water, or by blowing water vapor into the stream of gas. Inert gases such as nitrogen or methane may also be mixed with the gas.

In order to avoid a subsequent splitting of the acetaldehyde formed into carbon monoxide and methane the operation is usually carried out at temperatures below 450° C., preferably between about 300° and 400° C. Only when employing a high velocity of flow temperatures above 450° C. may be used.

The gas containing acetaldehyde, water vapor and acetylene which leaves the reaction chamber may be further subjected to reaction in a second reaction chamber or by working in a cycle, if desired after removal of the acetaldehyde.

The heat content of the gas leaving a reaction chamber may be used for preheating the gas entering a second reaction chamber, for producing water vapor of low pressure or for expelling the acetaldehyde from the aqueous solution. The process may be carried out at atmospheric pressure or at reduced or elevated pressures, for example at about 500 millimeters mercury gauge or up to about 2 atmospheres.

The following examples will further illustrate the nature of this invention but the invention is not restricted to these examples.

Example 1

A mixure of 1 molecular proportion of acetylene and 6 molecular proportions of water vapor is led at 300° C. over a catalyst prepared by impregnating pieces of clay with silico-tungstic acid at a speed of about 250 liters per hour and per liter of reaction space. By a single passage over this catalyst from 20 to 30 per cent of the acetylene is converted into acetaldehyde. The effluent gas is cooled and thus a 10 per cent aqueous solution of acetaldehyde is obtained. The unchanged acetylene after the addition of fresh water vapor is again led over the catalyst by means of a circulating pump.

If the hot effluent gas is employed for concentrating the aqueous solution of acetaldehyde formed, and is led without cooling through a suitable column, an approximately 60 per cent solution of acetaldehyde may be readily obtained without the necessity for special energy.

*Example 2*

The same gas mixture as described in Example 1 is led at a temperature of 340° C. and at a pressure of 800 millimeters of mercury over a catalyst prepared by impregnating pieces of clay with ammonium tungstate and heating the mass to 400° C. in a stream of air. By a single passage over this catalyst 35 per cent of the acetylene employed is converted into acetaldehyde. A second apparatus which is under a pressure of 600 millimeters of mercury is connected to the first in such a manner that the heat set free by condensing the effluent gas is utilized for the production of the water vapor necessary for the apparatus which is working under low pressure.

What we claim is:—

1. In the catalytic production of acetaldehyde from a mixture containing acetylene and steam, at an elevated temperature, the step which comprises contacting the said mixture with a catalytic substance which is free from iron and its compounds and comprises an oxidic compound of tungsten.

2. In the catalytic production of acetaldehyde from a mixture containing acetylene and steam, while heating, the step which comprises contacting the said mixture with a catalytic substance which is free from iron and its compounds and comprises a complex compound of tungstic acid.

3. In the production of acetaldehyde from a mixture containing acetylene and steam, while heating, the step which comprises contacting the said mixture with a catalytic substance which is free from iron and its compounds and comprises an oxidic compound of tungsten and a carrier.

4. In the production of acetaldehyde from a mixture containing acetylene and steam, while heating, the step which comprises contacting the said mixture with a catalytic substance which is free from iron and its compounds and comprises an oxidic compound of tungsten, and contacting the resulting gaseous and vaporous products again with a catalytic substance of the aforesaid nature.

5. The process for the production of acetaldehyde which comprises contacting a mixture containing acetylene and steam, while heating to from 300° to 400° C, with a catalytic substance consisting of tungstic acid, deposited on a carrier.

6. The process for the production of acetaldehyde which comprises contacting a mixture containing acetylene and steam, while heating to about 300° C., with a catalytic substance consisting of silico-tungstic acid deposited on a carrier.

In testimony whereof we have hereunto set our hands.

HORST-DIETRICH v. D. HORST.
RUDOLF WIETZEL.